United States Patent
Noh et al.

(10) Patent No.: US 8,807,820 B2
(45) Date of Patent: Aug. 19, 2014

(54) DISPLAY APPARATUSES

(75) Inventors: Cheolyong Noh, Cheonan-si (KR);
Hyunchul Bae, Suwon-si (KR);
Seongsik Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 97 days.

(21) Appl. No.: 13/351,018

(22) Filed: Jan. 16, 2012

(65) Prior Publication Data

US 2013/0027965 A1  Jan. 31, 2013

(30) Foreign Application Priority Data

Jul. 28, 2011 (KR) .................. 10-2011-0075439

(51) Int. Cl.
*F21V 7/04* (2006.01)
*B60Q 1/06* (2006.01)
*F21V 29/00* (2006.01)
*G02F 1/1333* (2006.01)

(52) U.S. Cl.
CPC .... *G02F 1/133308* (2013.01); *G02F 1/133385* (2013.01)
USPC ........... 362/632; 362/634; 362/633; 362/294; 362/373

(58) Field of Classification Search
USPC ........ 362/632–634, 294, 373; 349/56, 58–60, 349/65
See application file for complete search history.

(56) References Cited

U.S. PATENT DOCUMENTS

| 6,388,722 | B1* | 5/2002 | Yoshii et al. | 349/62 |
| 6,559,908 | B2* | 5/2003 | Hiratsuka et al. | 349/58 |
| 6,667,780 | B2* | 12/2003 | Cho | 349/58 |
| 6,870,582 | B2* | 3/2005 | Hayashimoto et al. | 349/58 |
| 7,190,423 | B2* | 3/2007 | Sugawara et al. | 349/58 |
| 7,422,358 | B2* | 9/2008 | Weng et al. | 362/633 |
| 7,722,229 | B2* | 5/2010 | Chang | 362/374 |
| 7,782,418 | B2* | 8/2010 | Ke et al. | 349/58 |
| 7,821,595 | B2* | 10/2010 | Ke et al. | 349/58 |
| 7,896,536 | B2* | 3/2011 | Arita et al. | 362/633 |
| 7,940,287 | B2* | 5/2011 | Kim et al. | 349/60 |
| 8,021,034 | B2* | 9/2011 | Lee et al. | 362/633 |
| 8,049,834 | B2* | 11/2011 | Mo et al. | 349/58 |
| 2004/0080952 | A1* | 4/2004 | Chu et al. | 362/374 |
| 2004/0160546 | A1* | 8/2004 | Huang et al. | 349/58 |
| 2005/0231658 | A1* | 10/2005 | Chieh | 349/56 |
| 2006/0268194 | A1* | 11/2006 | Morimoto et al. | 349/65 |
| 2010/0118225 | A1* | 5/2010 | Lee | 349/58 |
| 2011/0025942 | A1* | 2/2011 | Lee | 349/58 |

FOREIGN PATENT DOCUMENTS

| JP | 2009229965 A | 10/2009 |
| KR | 1020070015698 A | 2/2007 |
| KR | 1020070084705 A | 8/2007 |

* cited by examiner

*Primary Examiner* — Peggy Neils
*Assistant Examiner* — Erin Kryukova
(74) *Attorney, Agent, or Firm* — Cantor Colburn LLP

(57) ABSTRACT

A display apparatus includes a display panel which displays an image, a backlight unit which provides light to the display panel, a heat sink plate adjacent to the backlight unit, the heat sink plate including a catch portion on one side surface thereof, and a mold frame between the display panel and the backlight unit, the mold frame including a first hook which is coupled with the catch portion.

6 Claims, 5 Drawing Sheets

DISPLAY APPARATUSES

This application claims priority to Korean Patent Application No. 10-2011-0075439, filed on Jul. 28, 2011, and all the benefits accruing therefrom under 35 U.S.C. §119, the entire contents of which are hereby incorporated by reference.

BACKGROUND OF THE INVENTION (1) Field of the Invention

The invention disclosed herein relates to a display apparatus, and more particularly, to a liquid crystal display apparatus.

(2) Description of the Related Art

In general, a display apparatus includes a display panel, a backlight unit for providing light to the display panel, a mold frame disposed between the display panel and the backlight unit, a top chassis disposed on an edge of the display panel, a heat sink plate for dissipating heat generated from the backlight unit, and a bottom chassis for receiving the display panel, the backlight unit, and the heat sink plate. Generally, the top chassis, the mold frame, the heat sink plate, and the bottom chassis have side surfaces facing and overlapping each other. The top chassis, the mold frame, the heat sink plate, and the bottom chassis which overlap each other may be coupled to one another by inserting screws through the display apparatus.

To couple the top chassis, the mold frame, the heat sink plate, and the bottom chassis to one another using screws, a sufficient area may be necessary on a side surface (e.g., a bezel) of the display panel for assembling the screws in addition to an active area of the display panel necessary for displaying images. However, it is required to reduce the widths of side surfaces of a liquid crystal display apparatus except for an active area of the liquid display apparatus. Thus, research is required on the coupling of a top chassis, a mold frame, a heat sink plate, and a bottom chassis.

BRIEF SUMMARY OF THE INVENTION

The invention provides a display apparatus which is capable of reducing a width of a side surface except for an active area of a display panel.

Embodiments of the invention provide display apparatuses including: a display panel which displays an image; a backlight unit which provides light to the display panel; a heat sink plate disposed adjacent to the backlight unit, the heat sink plate including a catch portion on one side surface thereof; and a mold frame disposed between the display panel and the backlight unit, the mold frame including a first hook which couples with the catch portion.

In some embodiments, the display apparatuses may further include a top chassis covering an edge of the display panel and including a second hook which couples with the catch portion.

In other embodiments, the top chassis may include a window which exposes the first hook.

In still other embodiments, the second hook and the window may be provided in plurality, and the plurality of second hooks and windows may be alternately arranged.

In even other embodiments, the backlight unit may include: a light source which generates the light; and a light guide plate which receives the light from the light source and guides the light toward the display panel.

In yet other embodiments, the display apparatuses may further include a bottom chassis which receives the display panel, the backlight unit, and the heat sink plate. The bottom chassis may expose at least a portion of the heat sink plate at which the light source is disposed.

In other embodiments of the invention, display apparatuses include: a display panel which displays an image; a backlight unit including a light source which generates light and a light guide plate disposed on a side of the light source and guides the light to the display panel; a heat sink plate disposed adjacent to the backlight unit to dissipate heat generated from the backlight unit; and a bottom chassis which receives the display panel, the backlight unit, and the heat sink plate, the bottom chassis exposing at least a portion of the heat sink plate at which the light source is disposed. The portion of the heat sink plate exposed by the bottom chassis is thicker than a portion of the heat sink plate which overlaps the bottom chassis.

In some embodiments, the heat sink plate may include a catch portion disposed on a side surface of the backlight unit.

In other embodiments, the display apparatuses may further include a mold frame, and the mold frame includes: a portion disposed between the display panel and the backlight unit; and a first hook extending from the portion which couples with the catch portion.

In still other embodiments, the display apparatus may further include a top chassis, and the top chassis includes: a first portion which overlaps an edge of the display panel; and a second portion extending the first portion and including a second hook which couples with the catch portion.

In even other embodiments, the second portion may further include a window, and the window may expose the first hook.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION OF THE INVENTION

Figure 1:
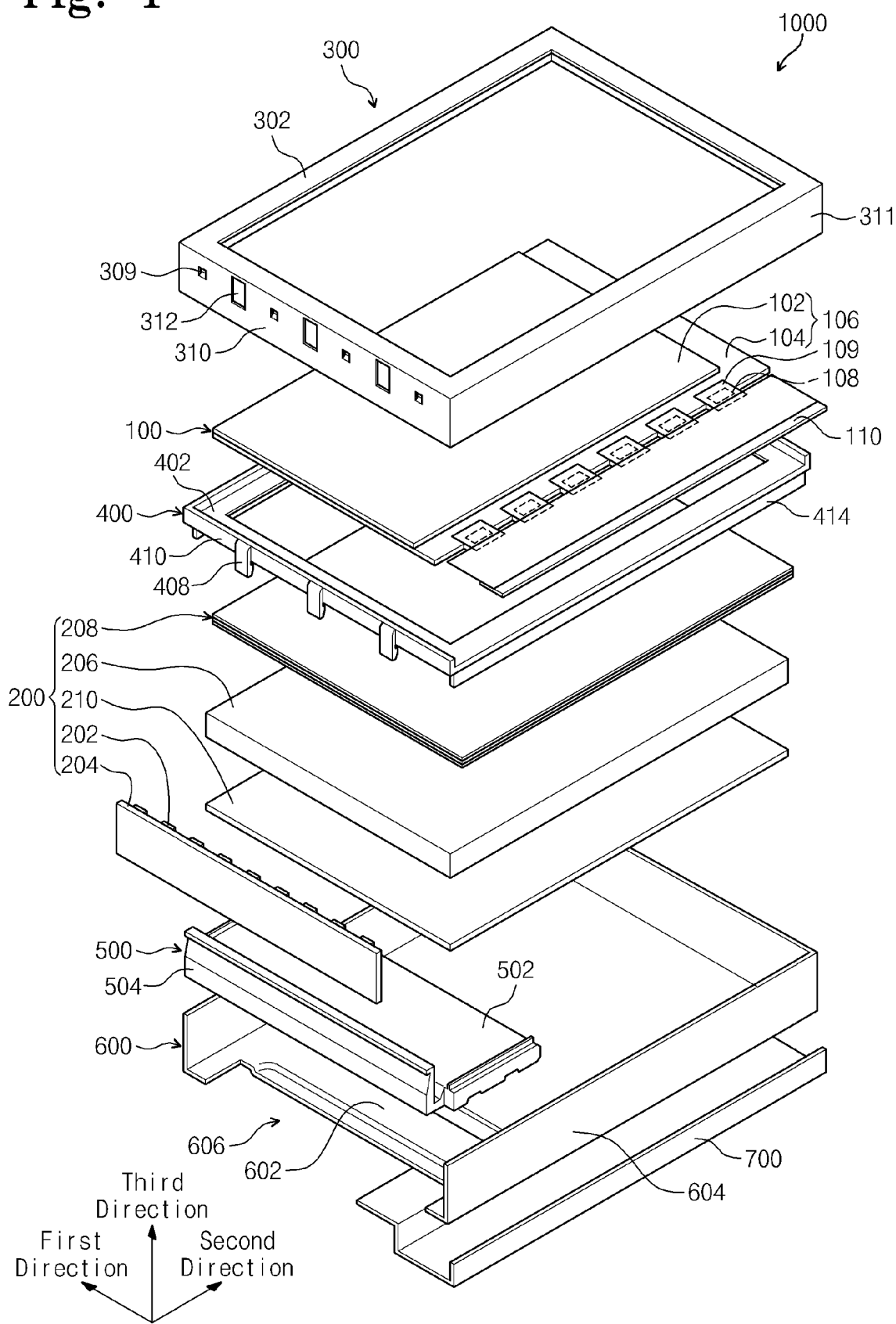
FIG. 1 is an exploded perspective view of an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "upper" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the invention will be described below in more detail with reference to the accompanying drawings.

Figure 2:
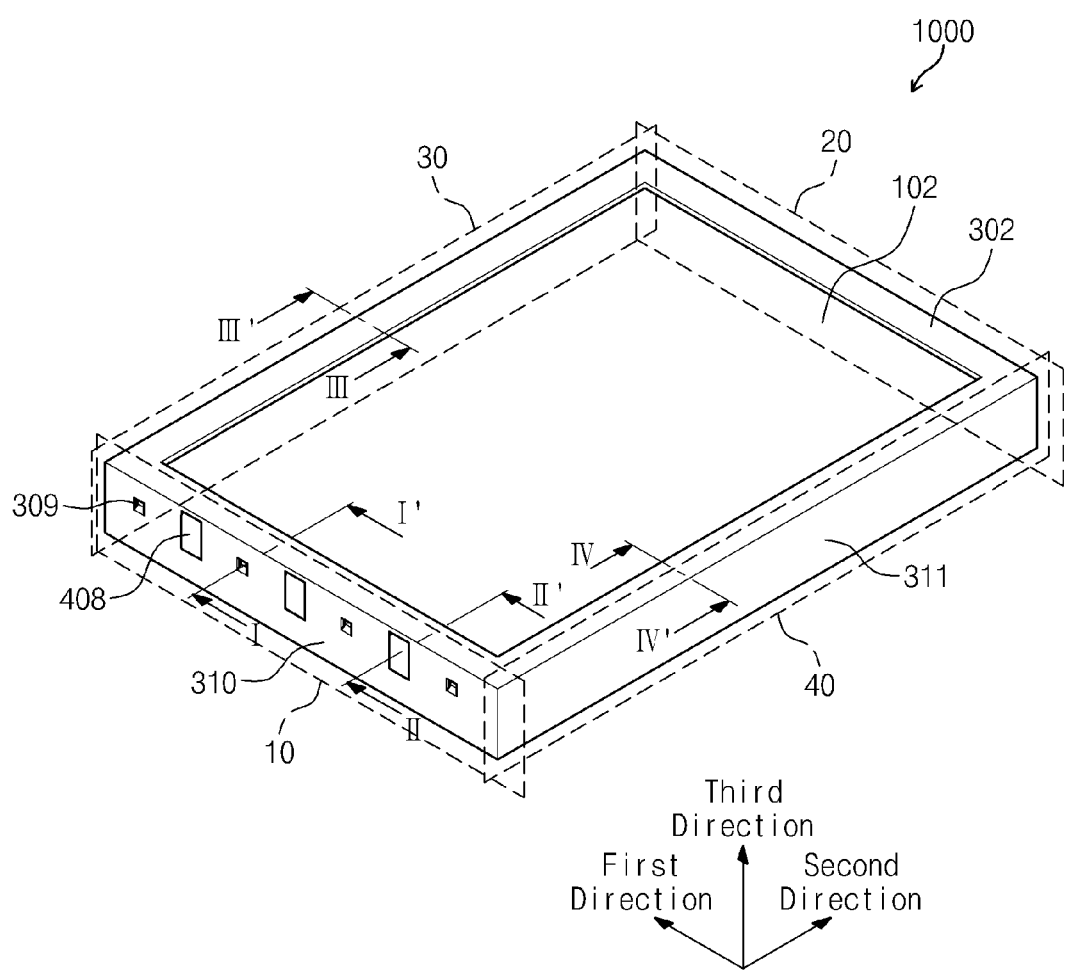
FIG. 2 is a perspective view of the display apparatus of FIG. 1 assembled, according to the invention.
Figure 3:
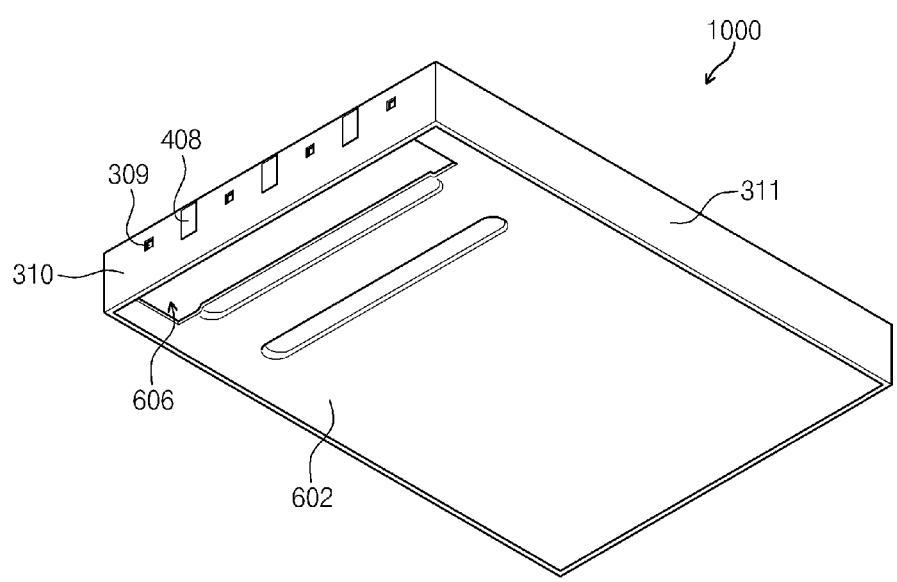
FIG. 3 is a bottom perspective view of the assembled display apparatus of FIG. 2 according to the invention.

FIG. 1 is an exploded perspective view of an exemplary embodiment of a display apparatus according to the invention. FIG. 2 is a perspective view of an exemplary embodiment of an assembled display apparatus according to the invention. FIG. 3 is a bottom perspective view of an exemplary embodiment of a display apparatus according to the invention. Here, FIG. 2 is a perspective view illustrating a state in which components of the display apparatus of FIG. 1 are assembled, and FIG. 3 is a bottom perspective view illustrating a state in which the components of the display apparatus of FIG. 1 are assembled.

Figure 4:
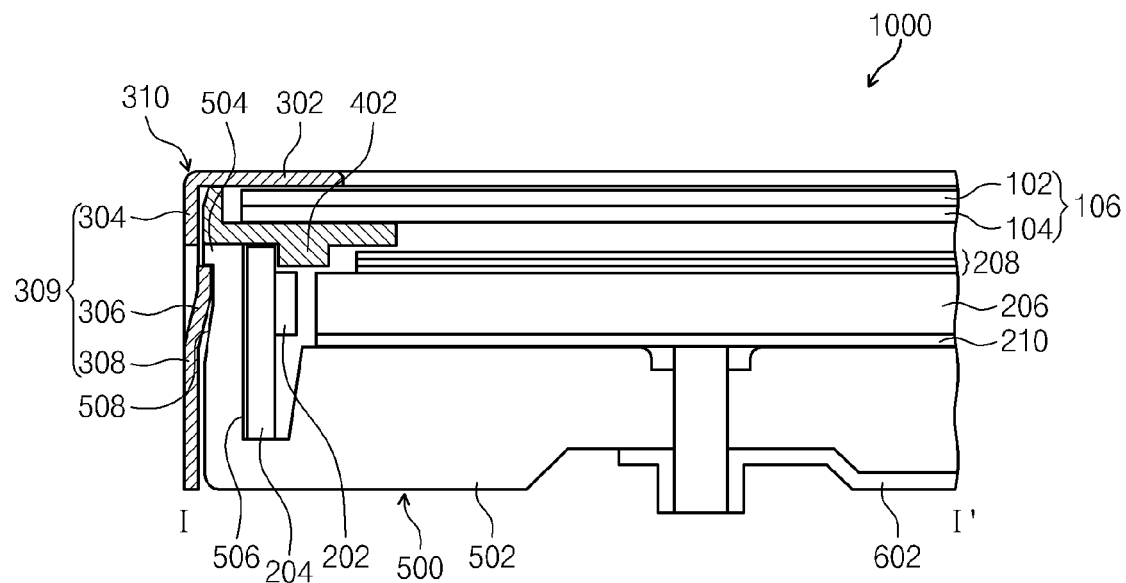
FIG. 4 is a cross-sectional view of the display apparatus taken along line I-I' of FIG. 2 according to the invention.
Figure 5:
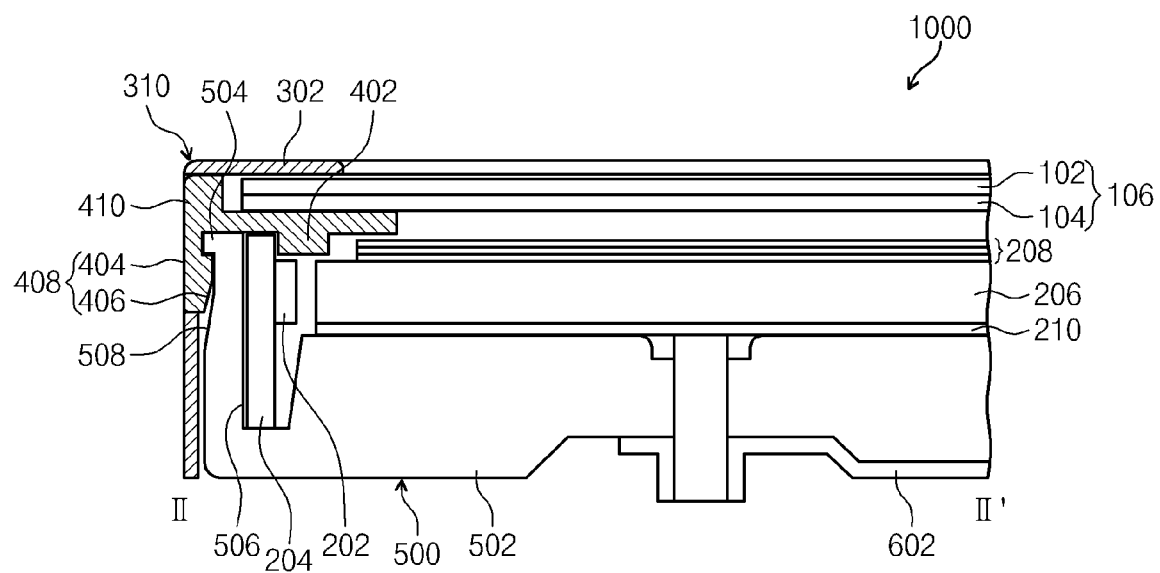
FIG. 5 is a cross-sectional view of the display apparatus taken along line II-II' of FIG. 2 according to the invention.

FIG. 4 is a cross-sectional view of an exemplary embodiment of a display apparatus according to the invention. FIG. 5 is a cross-sectional view of an exemplary embodiment of a display apparatus according to the invention. Here, FIG. 4 is a cross-sectional view taken along line I-I' in the display apparatus of FIG. 2, and FIG. 5 is a cross-sectional view taken along line II-II' in the display apparatus of FIG. 2.

Figure 6:
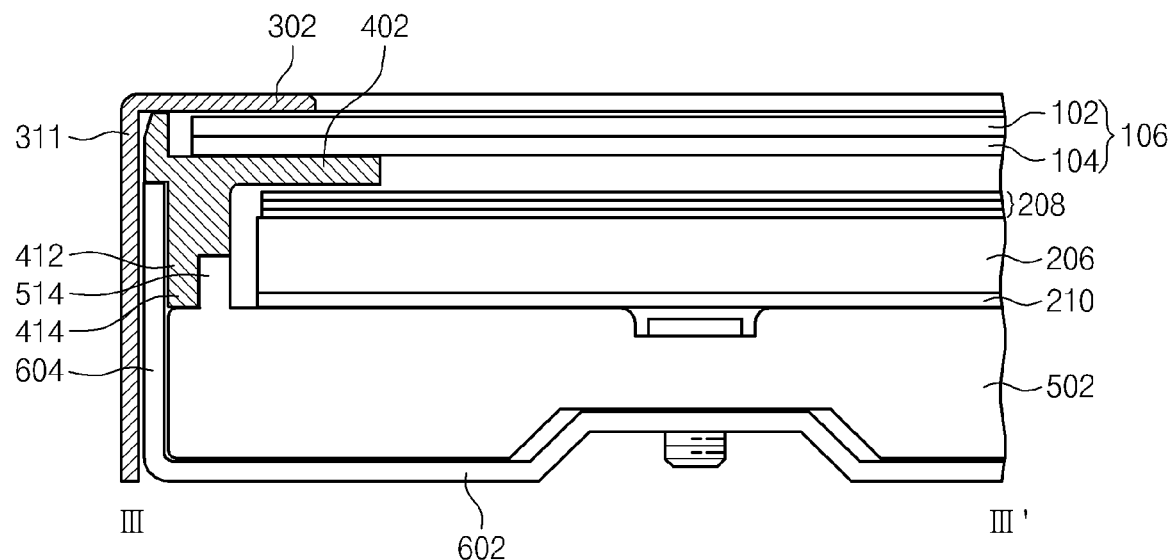
FIG. 6 is a cross-sectional view of the display apparatus taken along line III-III' of FIG. 2 according to the invention.
Figure 7:
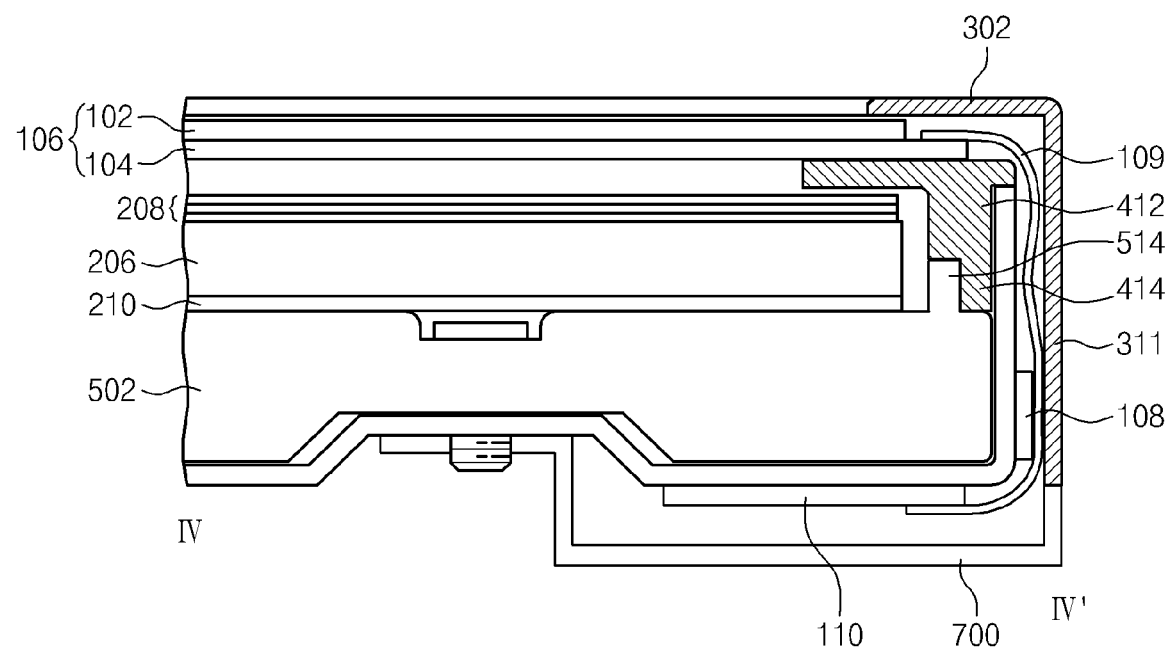
FIG. 7 is a cross-sectional view of the display apparatus taken along line IV-IV' of FIG. 2 according to the invention.

FIG. 6 is a cross-sectional view of an exemplary embodiment of a display apparatus according to the invention. FIG. 7 is a cross-sectional view of an exemplary embodiment of a display apparatus according to the invention. Here, FIG. 6 is a cross-sectional view taken along line III-III' in the display apparatus of FIG. 2, and FIG. 7 is a cross-sectional view taken along line IV-IV' in the display apparatus of FIG. 2.

Referring to FIGS. 1 to 3, a display apparatus 1000 may include a display unit 100, a backlight unit 200, a top chassis 300, a mold frame 400, a heat sink plate 500, and a bottom chassis 600.

In a plan view of the display apparatus 1000 according to the invention, the display apparatus 1000 may have a rectangular structure. The display apparatus 1000 may have short side surfaces 10 and 20 longitudinally extending in a first direction and facing each other, and long side surfaces 30 and 40 longitudinally extending in a second direction perpendicular to the first direction and facing each other. Also, the bottom chassis 600, the heat sink plate 500, the backlight unit 200, the mold frame 400, the display unit 100, and the top chassis 300 of the display apparatus 1000 may be successively stacked in a third direction perpendicular to the first and second directions.

The display unit 100 may include a display panel 106 for displaying an image, a drive chip 108 for providing a drive signal into the display panel 106, and a main circuit board 110 electrically connected to the display panel 106.

The display panel 106 may include an array substrate 102, a color filter substrate 104 coupled to face the array substrate 102, and a crystal liquid layer (not shown) disposed between the array substrate 102 and the color filter substrate 104.

A plurality of circuits are disposed on the array substrate 102 in a matrix form. The plurality of circuits may include a plurality of pixels. In an exemplary embodiment, each of a plurality of pixels may include a gate line (not shown) extending in the first direction, a data line (not shown) extending in the second direction perpendicular to the first direction to cross the gate line and insulated from the gate line, and a pixel electrode (not shown). Also, a thin film transistor ("TFT," not shown) may be disposed on each of the pixels and connected to the gate line, the data line, and the pixel electrode.

Red, green, and blue ("RGB") pixels (not shown) that are colored pixels may be disposed on the color filter substrate 104, such as through a thin film process. Also, a common electrode (not shown) facing the pixel electrode may be disposed on the color filter substrate 104. Thus, the liquid crystal layer may be arranged by a voltage applied into the pixel electrode and the common electrode to adjust transmittance of light provided from the backlight unit 200.

The drive chip 108 for applying the drive signal into the data line and the gate line may be mounted on at least one side of the array substrate 102. The drive chip 108 may generate the drive signal for driving the display panel 106 in response to an external signal. The external signal may be a signal supplied from the main circuit board 110. The external signal may include an image signal, various control signals, and a drive voltage.

The drive chip 108 may include two or more chips which are divided into a data drive chip and a gate drive chip. Alternatively, the drive chip 108 may include only one chip. The drive chip 108 may be mounted on the array substrate 102 through a chip on glass ("COG") process.

The main circuit board 110 may be electrically connected to the display panel 106 by a flexible printed circuit ("FPC") board 109. In exemplary embodiments, a FPC board may be used as the main circuit board 110. The FPC board 109 connected to the main board 110 may overlap side surfaces of the display unit 100, the mold frame 400, the backlight unit 200, and the bottom chassis 600, and the main circuit board 110 may be disposed on a lower portion of the bottom chassis 600, e.g., facing a lower surface of the bottom chassis 600. In this case, the display apparatus 1000 may further include an auxiliary chassis 700 disposed under the bottom chassis 600 to protect the main circuit board 110.

The backlight unit 200 may include a light source 202 for generating light, and a light guide plate 206 receiving the light from the light source 202 to guide the light toward the display unit 100.

In the illustrated embodiments, the backlight unit 200 may be an edge type backlight unit. That is, the light source 202 of the backlight unit 200 may provide light from a lower side of the display panel 106 toward the side surface, and the provided light may be transmitted to the display unit 100 through the light guide plate 206.

The light source 202 has one side contacting a light source support 204 for supporting the light source 202, and an opposite side facing the light guide plate 206. According to the embodiments of the invention, the light source 202 may be disposed adjacent to one of the short side surfaces 10 and 20 of the display apparatus 1000. For ease of description, hereinafter, the short side surface disposed adjacent to the light source 202 will be referred to as a first short side surface 10, and the other short side surface will be referred to as a second short side surface 20. Also, one of the long side surfaces 30 and 40 will be referred to as a first long side surface 30, and the other one of the long side surfaces 30 and 40 will be referred to as a second long side surface 40.

The light source support 204 may longitudinally extend in the first direction. In one embodiment, for example, the light source 202 may include a plurality of light emitting diodes ("LEDs"). The plurality of LEDs may be spaced from each other in the first direction on the light source support 204.

The light guide plate 206 may face the light source 202 and be spaced from the light source 202 in the second direction. The light guide plate 206 may have an incident surface (not shown) through which the light emitted from the light source 202 is incident, an exit surface (not shown) through which the light incident through the incident surface is emitted toward the display unit 100, and a reflective surface (not shown) for reflecting the light incident through the incident surface toward the exit surface.

The backlight unit 200 may further include a plurality of optical sheets 208 disposed on the exit surface of the light guide plate 206, and a reflective plate 210 disposed adjacent to the reflective surface of the light guide plate 206.

The plurality of optical sheets 208 may include a diffusion sheet for diffusing light, and at least one light collection sheet for collecting light to improve brightness and a viewing angle of the light emitted through the exit surface. The reflective plate 210 may reflect again light leaking through the reflective surface to allow the reflected light to be incident again toward the light guide plate 206.

The top chassis 300 may include a first portion 302 disposed along a peripheral area of the display panel 106 and a second portion 310 extending from the first portion 302 to cover the side surface of the display panel 106 and the side surface of the backlight unit 200. The first portion 302 of the top chassis 300 may include an opened central portion to display an image.

Referring to FIGS. 1 and 4, the second portion 310 of the first short side surface 10 may include a first hook 309 and a window 312. According to an embodiment of the invention, the first hook 309 and the window 312 may be provided in plurality. A first plurality of first hooks 309 and windows 312 may be spaced from each other in the first direction. According to another embodiment of the invention, the first hooks 309 and the windows 312 may be alternately disposed.

The first hook 309 may be a portion of the second portion 310. That is, the hook 309 and the second portion 310 may be a single, unitary, indivisible member, along with remaining portions of the top chassis 300. The first hook 309 may include an upper portion 304 covering the side surface of the display unit 100 and extending along the mold frame 400, a middle portion 306 which is a portion of the second portion 310 cut and bent (e.g., separated) from the upper portion 304, and a lower portion 308 extending from the middle portion 306 along the side surface of the heat sink plate 500. According to an embodiment of the invention, surfaces of the upper portion 304 and lower portion 308 of the first hook 309 may have the substantially same plane. A surface of the middle portion 306 having the bent portion may be a plane substantially different from the surfaces of the upper and lower portions 304 and 308. In one exemplary embodiment, for example, the middle portion 306 of the first hook 309 may be bent toward a side in which the mold frame 400 is disposed. According to an embodiment of the invention, the upper, middle, and lower portions 304, 306, and 308 of the first hook 309 may have the substantially same width, such as taken in the first direction.

According to several embodiments of the invention, the first hook 309 may have a structure corresponding to a shape of the heat sink plate 500. Also, the first hook 309 may include a material having elasticity and thus coupled to the heat sink plate 500. This will be described below in detail.

A portion of the mold frame 400 may be disposed within the window 312. A surface of the mold frame 400 may be exposed to an outside of the display apparatus 1000 through the window 312 at the second portion 310 of the top chassis 300 in which the window 312 is disposed. According to an embodiment of the invention, the window 312 may extend from a portion at which the first and second portion 302 and 310 of the top chassis 300 contact each other up to a remaining portion of the second portion 310. The first hook 309 may not be disposed on the portion in which the window 312 is disposed.

Referring to FIGS. 1, 6, and 7, the remaining second portions 311 (hereinafter, referred to as exceptional second portions) except for the second portion 310 corresponding to the first short side surface 10 may have various structures. In one embodiment, for example, the exceptional second portions 311 may have a structure in which the first hook 309 and the window 312 are not disposed, and the side surfaces of the display unit 100 and the backlight unit 200 are covered. Alternatively, the first hook 309 and the window 312 disposed on the second portion 310 corresponding to the first short side surface 10 may be disposed also on the exceptional second portions 311. The invention is not limited to the structures of the exceptional second portions 311 in the illustrated embodiments.

Referring again to FIG. 1, the mold frame 400 may be disposed between the display unit 100 and the backlight unit 200. The mold frame 400 may include a third portion 402 disposed between the display unit 100 and the backlight unit 200 and a fourth portion 410 extending from the third portion 402 toward sidewalls of the display unit 100 and the backlight unit 200. The third portion 402 may have a structure which covers an edge of the backlight unit 200 and has an opened central portion.

According to the embodiments of the invention, the fourth portion 410 of the mold frame 400 may include a second hook 408. Referring to FIGS. 1 and 5, the second hook 408 may be a portion which extends from the fourth portion 410 corresponding to the first short side surface 10 to cover a side surface of the light source support 204. The second hook 408 may include a protrusion surface 406 facing the heat sink plate 500 and a surface 404 facing the protrusion surface 406. The surface 404 facing the protrusion surface 406 may have a vertical surface in the third direction. The vertical surface 404 of the second hook 408 may be exposed by the window 312 of the top chassis 300. According to an embodiment of the invention, the vertical surface 404 may be substantially flush with an outer surface of the top chassis 300. According to another embodiment of the invention, the second hook 408 may be integrated with the fourth portion 410 of the mold frame 400 such that the second hook 408 forms a single, unitary, indivisible member with a remainder of the mold frame 400. The second hook 408 may have a structure corresponding to a shape of the heat sink plate 500 facing thereto. This will be described below in detail.

Referring to FIGS. 1, 2, 6, and 7, a mold frame connection part 412 may be a portion which extends from the fourth portion 410 corresponding to the second short side surface 20 and the first and second long side surfaces 30 and 40 toward the bottom chassis 600. The mold frame connection part 412 may include a first protrusion 414 extending toward the bottom chassis 600. The first protrusion 414 may have a structure corresponding to a shape of the heat sink plate 500. This will be described below in detail.

The heat sink plate 500 may be disposed between the backlight unit 200 and the bottom chassis 600. According to the embodiments of the invention, the heat sink plate 500 may include a fifth portion 502 disposed between the backlight unit 200 and the bottom chassis 600 and a catch portion 504 extending from the fifth portion 502 in the third direction along a sidewall of the backlight unit 200.

The fifth portion 502 of the heat sink plate 500 may partially cover the backlight unit 200. According to an embodiment of the invention, the heat sink plate 500 may be disposed to cover at least a portion at which the light source 202 of the backlight unit 200 is disposed. The heat sink plate 500 may extend in the second direction to cover the portion at which the light source 202 is disposed and partially cover the light guide plate 206. According to an embodiment of the invention, the fifth portion 502 of the heat sink plate 500 may have different thicknesses. The fifth portion 502 of the heat sink plate 500 corresponding to the portion at which the light source 202 is disposed may have a thickness substantially less than that of the fifth portion 502 of the heat sink plate 500 corresponding to the portion at which the light guide plate 206 is disposed. According to an embodiment of the invention, a recessed portion may be defined in a portion at which the fifth portion 502 contacts the catch portion 504. The light source support 204 and the light source 202 may be disposed in the recessed portion.

Referring to FIGS. 1, 2, 4, and 5, the catch portion 504 of the heat sink plate 500 disposed adjacent to the first short side surface 10 may have a first surface 506 contacting the light source support 204 and a second surface 508 facing the first surface 506. The first surface 506 may have a vertical surface. The second surface 508 may have a shape corresponding to those of the first and second hooks 309 and 408. Also, the catch portion 504 may extend in the first direction.

The first and second hooks 309 and 408 may be coupled to the catch portion 504. Since the first and second hooks 309 and 408 are alternately coupled to the catch portion 504, the heat sink plate 500 may be easily manufactured. Thus, manufacturing costs may be reduced.

Referring to FIGS. 4 and 5, the first hook 309 may be coupled to the heat sink plate 500. In more detail, the first hook 309 may be inserted into the catch portion 504 of the heat sink plate 500. The middle portion 306 of the first hook 309 may include a portion bent toward a side in which the heat sink plate 500 is disposed. The bent portion may be inserted into the catch portion 504. Since the bent portion of the first hook 309 is inserted into the catch portion 504, the top chassis 300 and the heat sink plate 500 may be physically coupled to each other.

The second hook 408 may be also coupled to the heat sink plate 500. In more detail, the second hook 408 may be inserted into the catch portion 504. The second hook 408 may have the protrusion surface 406. The protrusion surface 406 may be inserted into the catch portion 504. Since the protrusion surface 406 of the second hook 408 is inserted into the catch portion 504, the mold frame 400 and the heat sink plate 500 may be physically coupled to each other.

Referring to FIGS. 1, 6, and 7, each of portions corresponding to the first and second long side surfaces 30 and 40 of remaining portions of the heat sink plate 500 except the catch portion 504 corresponding to the first short side surface 10 may include a second protrusion 514. The second protrusion 514 may be disposed facing the first protrusion 414 of the mold frame connection part 412. The first protrusion 414 may be disposed and fixed between the second protrusion 514 and the bottom chassis 600.

The heat sink plate 500 may dissipate heat generated from the backlight unit 200 to the outside of the display apparatus 1000. Also, the heat sink plate 500 may include a metal such as aluminum (Al). Also, the bottom chassis 600 may include a metal such as aluminum (Al). Thus, the display unit 100 including the heat sink plate 500 and the bottom chassis 600 which include the metals, respectively may have superior stiffness.

Referring to FIGS. 1 to 3, the bottom chassis 600 may have a bottom surface 602, and sidewalls 604 extending from the bottom surface 602 in a vertical direction to receive the top chassis 300, the backlight unit 200, and the heat sink plate 500. According to the embodiments of the invention, the bottom chassis 600 may have a structure which exposes the heat sink plate 500 corresponding to the portion at which at least the light source 202 is disposed. Portions of the sidewalls 604 and the bottom surface 602 disposed adjacent to the light source 202 may be removed to form an opening 606. The heat sink plate 500 corresponding to the portion at which at least the light source 202 is disposed may be exposed by the opening 606. According to an embodiment of the invention, the heat sink plate 500 corresponding to the portion at which the light source 202 is disposed and the heat sink plate 500 corresponding to the portion at which the light guide plate 206 is disposed may be exposed through the opening 606.

Referring to FIGS. 1, 6, and 7, the remaining sidewalls 604 of the bottom chassis 600 except the sidewall 604 of the bottom chassis 600 corresponding to the first short side surface 10 may be disposed to cover the side surface of the heat sink plate 500 and the side surface of the mold frame 400. Also, the remaining sidewalls 604 of the bottom chassis 600 except the sidewall 604 of the bottom chassis 600 corresponding to the first short side surface 10 may be covered by the top chassis 300.

Since the display apparatus includes the bottom chassis 600 having the structure which expose the heat sink plate 500 corresponding to the portion at which at least the light source 202 is disposed, the heat generated from the backlight unit 200 may be efficiently dissipated. Specifically, since the heat sink plate 500 disposed adjacent to the light source 202 from which light may be excessively generated is exposed to the outside, the heat sink efficiency may be improved. Also, since a portion of the heat sink plate 500 is disposed within the bottom chassis 600, the assembly between the bottom chassis 600 and the heat sink plate 500 may be improved.

According to the embodiments of the invention, the mold frame and the top chassis may be coupled to the catch portion of the heat sink plate to reduce an extra width occurring when the top chassis, the mold frame, and the heat sink plate are disposed facing and overlapping each other. In addition, the bottom chassis may be partially removed to improve the heat sink efficiency of the heat sink plate.

The above-disclosed subject matter is to be considered illustrative and not restrictive, and the appended claims are intended to cover all such modifications, enhancements, and other embodiments, which fall within the true spirit and scope of the invention. Thus, to the maximum extent allowed by law, the scope of the invention concept is to be determined by the broadest permissible interpretation of the following claims and their equivalents, and shall not be restricted or limited by the foregoing detailed description.

What is claimed is:

1. A display apparatus comprising:
   a display panel which displays an image;
   a backlight unit including a light source configured to generate light, and a light guide plate on a side of the light source, the light guide plate configured to guide the light to the display panel;
   a heat sink plate adjacent to the backlight unit, and including:
      a bottom portion,
      a sidewall portion extended from the bottom portion, and
      a catch portion extended from the sidewall portion and away from the backlight unit, the catch portion including a single lower surface elongated in a first direction;
   a mold frame between the display panel and the backlight unit, and including a plurality of first hooks which contacts with the single lower surface of the catch portion of the heat sink plate; and
   a bottom chassis which receives the display panel, the backlight unit, and the heat sink plate, and exposes a portion of the bottom portion of the heat sink plate proximate to the light source,
   wherein the exposed portion of the bottom portion of the heat sink plate is thicker than a portion of the bottom portion of the heat sink plate between the backlight unit and the bottom chassis.

2. The display apparatus of claim 1, further comprising a top chassis comprising:
   a first portion which overlaps an edge of the display panel; and
   a second portion which extends from the first portion, and includes a second hook which couples with the catch portion of the heat sink plate.

3. The display apparatus of claim 2, wherein the second portion of the top chassis further includes a window, and the window exposes a first hook among the plurality of first hooks of the mold frame to an outside of the display apparatus.

4. The display apparatus of claim 3, wherein
   the second hook and the window of the top chassis are provided in plurality, and
   the plurality of second hooks and windows alternate in the first direction in which the single lower surface of the catch portion of the heat sink plate is elongated.

5. A display apparatus comprising:
   a display panel which displays images;
   a backlight unit which generates light and provides the light to the display panel;
   a top chassis including a first sidewall portion in a non-display area of the display apparatus, the sidewall portion including a first coupling member;
   a heat sink plate including:
      a bottom portion,
      a second sidewall portion in the non-display area of the display apparatus, the second sidewall portion extending from the bottom portion, and
      a second coupling member extended from the second sidewall portion and away from the backlight unit, the second coupling member including a single lower surface elongated in a first direction; and
   a mold frame between the top chassis and the heat sink plate, and including a third sidewall portion in the non-display area of the display apparatus, the third sidewall portion including a third coupling member,
   wherein both the first coupling member of the top chassis and the third coupling member of the mold frame contact with the single lower surface of the second coupling member of the heat sink plate, in the non-display area of the display apparatus.

6. The display apparatus of claim 5, wherein the first coupling member of the top chassis and the third coupling member of the mold frame alternately contact the single lower surface of the second coupling member of the heat sink plate in the first direction.

* * * * *